US011741074B2

(12) United States Patent
Sharma et al.

(10) Patent No.: US 11,741,074 B2
(45) Date of Patent: Aug. 29, 2023

(54) AUTOMATED USER INTERFACE TESTING WITH MACHINE LEARNING

(71) Applicant: Fidelity Information Services, LLC, Jacksonville, FL (US)

(72) Inventors: Harsh Sharma, Bangalore (IN); Yogendra Singh Katheria, Uttar Pradesh (IN); Seerajudeen Sheik Ahamed, Tamil Nadu (IN); Rajiv Ramanjani, Bangalore (IN); Shefali Garg, Bangalore (IN)

(73) Assignee: Fidelity Information Services, LLC, Jacksonville, FL (US)

(*) Notice: Subject to any disclaimer, the term of this patent is extended or adjusted under 35 U.S.C. 154(b) by 69 days.

(21) Appl. No.: 17/492,236

(22) Filed: Oct. 1, 2021

(65) Prior Publication Data
US 2023/0057691 A1    Feb. 23, 2023

(30) Foreign Application Priority Data

Aug. 20, 2021  (IN) .............................. 202111037812

(51) Int. Cl.
*G06F 16/23*       (2019.01)
*G06F 16/955*      (2019.01)
*G06N 3/02*        (2006.01)
*G06F 11/07*       (2006.01)

(52) U.S. Cl.
CPC ...... *G06F 16/2358* (2019.01); *G06F 11/0745* (2013.01); *G06F 11/0769* (2013.01); *G06F 16/955* (2019.01); *G06N 3/02* (2013.01)

(58) Field of Classification Search
CPC .............. G06F 16/2358; G06F 16/955; G06F 11/0745; G06F 11/0769; G06N 3/02
See application file for complete search history.

(56) References Cited

U.S. PATENT DOCUMENTS

| | | | |
|---|---|---|---|
| 10,120,787 B1* | 11/2018 | Shemer ............... | G06F 11/3688 |
| 10,540,270 B1 | 1/2020 | Surkatty et al. | |
| 2011/0142103 A1* | 6/2011 | Suzuki .................. | H04L 69/40 |
| | | | 375/211 |
| 2014/0310769 A1 | 10/2014 | O'Neill et al. | |
| 2015/0370694 A1* | 12/2015 | Zhang ................. | G06F 11/3688 |
| | | | 717/124 |
| 2018/0011779 A1 | 1/2018 | Anifa | |
| 2018/0032428 A1* | 2/2018 | Gundeti ............. | G06F 11/3688 |
| 2020/0142817 A1* | 5/2020 | Thangam ........... | G06F 11/3684 |
| 2021/0081294 A1* | 3/2021 | Golubev .............. | G06F 18/214 |
| 2021/0150263 A1* | 5/2021 | Corwin .................. | G06F 9/451 |
| 2021/0216435 A1 | 7/2021 | Godefroid et al. | |
| 2021/0374569 A1* | 12/2021 | Jezewski ............... | G06N 20/00 |

OTHER PUBLICATIONS

Search Report and Written Opinion in counterpart PCT Application No. PCT/US2022/040558 dated Nov. 8, 2022 (9 pages).

\* cited by examiner

*Primary Examiner* — Huawen A Peng
(74) *Attorney, Agent, or Firm* — Finnegan, Henderson, Farabow, Garrett & Dunner LLP (57) ABSTRACT

Systems and methods are provided for implementing automated user interface testing with integrated machine learning models. Systems and methods for detecting and preemptively correcting flow path errors are disclosed. Systems and methods for minimizing user input and optimizing testing efficiency are disclosed. A result dashboard is disclosed in which testing results and errors are displayed and a user may interact with interactive testing reports.

18 Claims, 7 Drawing Sheets

AUTOMATED USER INTERFACE TESTING WITH MACHINE LEARNING

CROSS-REFERENCE TO RELATED APPLICATIONS

This application claims priority under 35 U.S.C. § 119 to Indian Patent Application No. 202111037812, filed on Aug. 20, 2021, the disclosure of which is expressly incorporated herein by reference in its entirety.

TECHNICAL FIELD

The present disclosure generally relates to systems and methods for implementing automated user interface testing. In particular, embodiments of the present disclosure relate to inventive and unconventional systems for integrating artificial intelligence and various service modules into a testing system.

BACKGROUND

Current automation testing tools are tightly coupled with particular automation testing frameworks and require scripts to be executed regularly using methodologies suitable only for a specific automation context or use. Likewise, automation frameworks often target only a single user base. As a consequence, current automation testing tools can be cumbersome, lead to cost and processing inefficiencies, require customized compatibility tools, and are often inaccessible except to the most experience users. Thus, testing tool implementers are currently forced to expend considerable time and resources to hire or train personnel with specialized programming knowledge to write automation scripts. Furthermore, even experienced personnel may be required to expend time and effort managing and operating automation testing tools, because analyzing an application user interface, identifying necessary locators, backtracking changes in a user interface to make corresponding script modification, and writing scripts for automation are each time-consuming tasks that may be necessary in modifying an automated testing tool.

Although current automation testing tools implement graphical user interfaces that seek to alleviate some of these drawbacks, integrating automation testing tools with a user interface also has significant drawbacks. For example, even small modifications to an automation testing tool on the user-facing front end may require significant back-end framework and script modifications. Thus, automation testing tools with user interfaces may still be cumbersome and costly in ways that are undesirable, and still leave much to be desired in terms of overall user-friendliness, cost efficiency, compatibility, and processing efficiency. These drawbacks are compounded when they limit testing framework accessibility to the users who might actually most frequently interact with it, such as a company's employees untrained in specialized programming syntax and manual framework testers.

In addition, persons or entities implementing automation testing across multiple databases must also implement multiple corresponding automation frameworks. Such implementations can be cumbersome, lead to cost and processing inefficiencies, require customized compatibility tools, and are often inaccessible except to the most experienced users. Whether implemented alone or in connection with other frameworks, current automation frameworks often require users to understand specialized programming syntax. This limits accessibility to the framework for the users who actually most frequently interact with it, such as a company's employees untrained in programming and manual framework testers.

SUMMARY

Embodiments of the present disclosure are directed to systems and methods for enabling autonomous automated user interface testing and services. An example method comprises receiving from a user a resource identifier associated with a resource, detecting one or more changes in a user interface of the resource, retrieving from a database update attributes associated with each of the one or more changes in the user interface, and updating the resource to incorporate each of the one or more update attributes.

Systems and computer-readable media (such as non-transitory computer-readable media) that implement the above method are also provided.

Additional objects and advantages of the embodiments will be set forth in part in the description which follows, and in part will be obvious from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to various embodiments, examples of which are illustrated in the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed systems and methods may be performed on a computer having at least a processor and a non-transitory memory capable of executing various instructions for conducting automation testing. One of ordinary skill will understand that many named and yet unnamed operating systems can be used to execute the various instructions. As a non-limiting example of suitable commercially available systems, operating system 102 may include Windows, Macintosh, iOS, Netware, Unix, Linux, Android, Ubuntu, and Chrome OS, among others.

Figure 1:
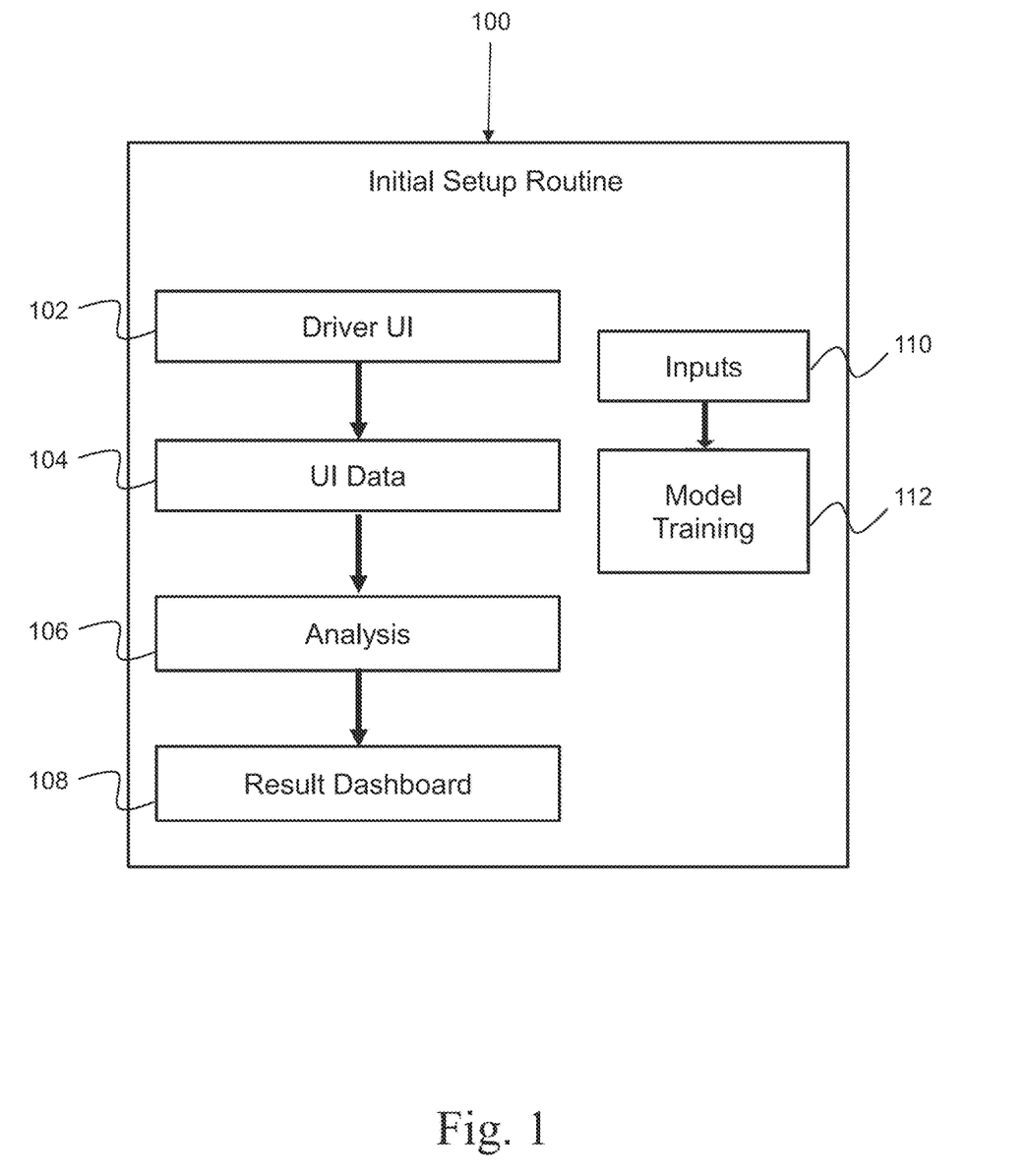
FIG. 1 illustrates a setup configuration module for an automated user interface testing framework under an embodiment of the present invention.

FIG. 1 illustrates an initial setup routine 100 for implementing automated user interface (hereinafter "UI") testing under disclosed embodiments of the present invention. Upon initiation, the initial setup routine 100 begins by passing a resource identifier to a driver UI 102. The driver UI 102 then extracts UI data 104 for analysis 106. The results of analysis 106 are then relayed to a result dashboard 108 and presented to a user of the automated user interface testing module.

For optimal ease of use and access, the driver UI 102 is configured as a web application to receive a single resource identifier to initiate setup for the automated UI testing module, thereby enabling a user to use and access the driver UI 102 from any device with a web browser and an internet connection. In some embodiments, for example, the driver UI 102 requires only a single Uniform Resource Locator (URL) that is intended for testing by the automated UI testing module. In instances where a website is intended to be tested, this enables virtually any user capable of identifying and inputting a URL to understand and use the automated UI testing module without the need for specialized programming syntax or even the intricacies of automated testing generally. Indeed, at least one purpose of the present disclosure is to ensure broad compatibility of the automated UI testing module with as wide an audience as possible to reduce the cost of labor and training associated with testing systems that otherwise require specialized experience or training.

During initial setup routine 100, the automated UI testing module extracts UI data 104 from the resource identified to the driver UI 102. In embodiments where the resource identifier is a URL identifying a website, the UI data extracted may include various interactive website features, such as text input fields, buttons, sliders, and radio buttons, and the like.

Detailed information regarding UI data 104 extracted from the resource and analyzed 106 is then displayed to a user in a result dashboard 108 via a display. The display may be, for example, a computer monitor, laptop display, tablet, smartphone, or other display capable of communicating visual and textual information to the user. The result dashboard 108 includes UI data 104 extracted from the resource, such as total flows, passing flows, and failing flows processed by the automated UI testing module. In some embodiments, result dashboard 108 also includes more detailed resource information, such as the total number of screens, or web pages visited, recorded during testing process and/or the resource identifier. In some embodiments, result dashboard 108 also includes analyzed performance data that may be displayed in visual and/or text format. For example, the result dashboard 108 may comprise one or more graphs depicting the number of passed or failed flows relative to the total flows tested by the automated UI testing module. A further description of the result dashboard is included hereafter in reference to FIGS. 4A-4D.

The initial setup routine 100 also includes model training 112 operating in parallel with the steps described above. The model training 112 uses inputs 110 received via the initial setup routine and compares them against results of analysis 106 to associate inputs 110 with passing or failing performance. The model training 112 comprises deep learning via a recurrent neural network. A more detailed description of the configuration and operation of model training and its impact on the system described herein is included hereafter in reference to FIG. 3. In some embodiments, inputs 110 include programming language elements contained within the resource identified to Driver UI 102. In embodiments where the resource is a website, for example, inputs 110 may include syntax configured to select nodes from an extensible markup language (XML) document, select elements from a Hypertext Markup Language (HTML) document, and/or select elements form one or more other data storage or transport documents associated with the website. An advantage of associating inputs 110 with model training 112 is that over iterated testing sequences, the automated UI testing module will prioritize known and successful error resolutions to reduce the likelihood of failed flows.

Figure 2:
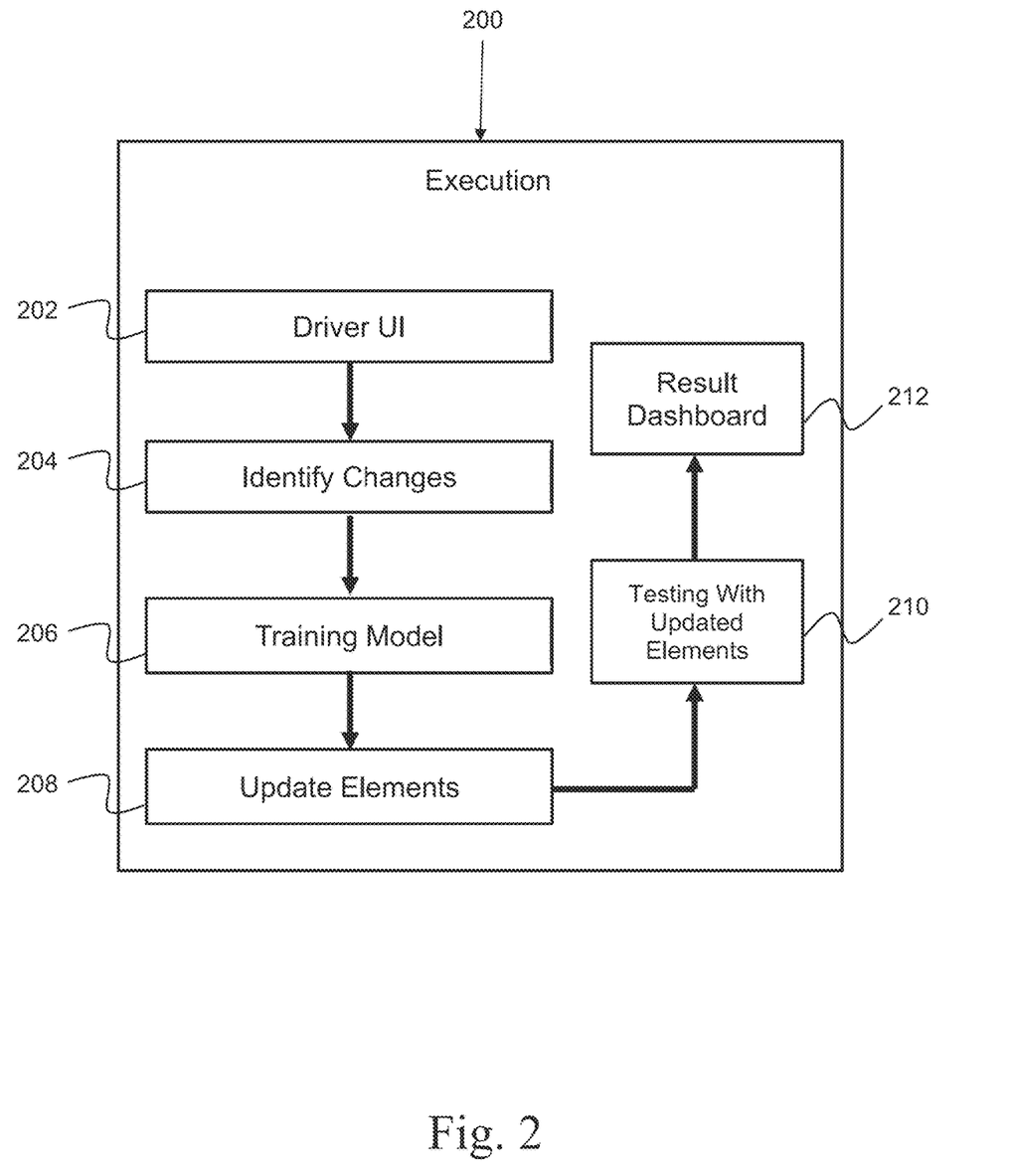
FIG. 2 illustrates an execution module for an automated user interface testing framework of an embodiment of the present invention.

FIG. 2 illustrates an execution sequence 200 performed by an automated UI testing module. The execution sequence 200 includes receiving inputs from a Driver UI 202, identifying changes 204, forwarding data to training model 206, updating elements 208, performing testing with updated elements 210, and forwarding results to result dashboard 212.

After initial setup routine 100 has been completed, the execution sequence 200 is configured to identify changes 204 in the UI from a previous iteration of the UI, thus detecting changes made by the user to the UI for automated testing. Identifying changes 204 may also include identifying flow changes based on user inputs via the UI. Each of the UI and/or flow changes identified is passed to the training model 206. In instances wherein identified changes 204 are recognized from previous valid flows, the training model will update one or more resource elements 208 to recreate the conditions for a valid flow. For example, in embodiments wherein the resource is a website and the training model has previously encountered a back-end script modification associated with an identified change 204 in the UI, the training model will apply the same back-end script modification to the website to recreate a passing flow result. In instances where the training model has not yet encountered the identified changes or learned how to update elements in a manner that avoids errors, it can draw from similar identified changes until it achieves a new valid flow. After the training model 206 updates elements 208, the automated UI testing module tests the resource with updated elements 210 and forwards results to a result dashboard 212, which is displayed for a user on a display as previously described in reference to FIG. 1.

Figure 3:
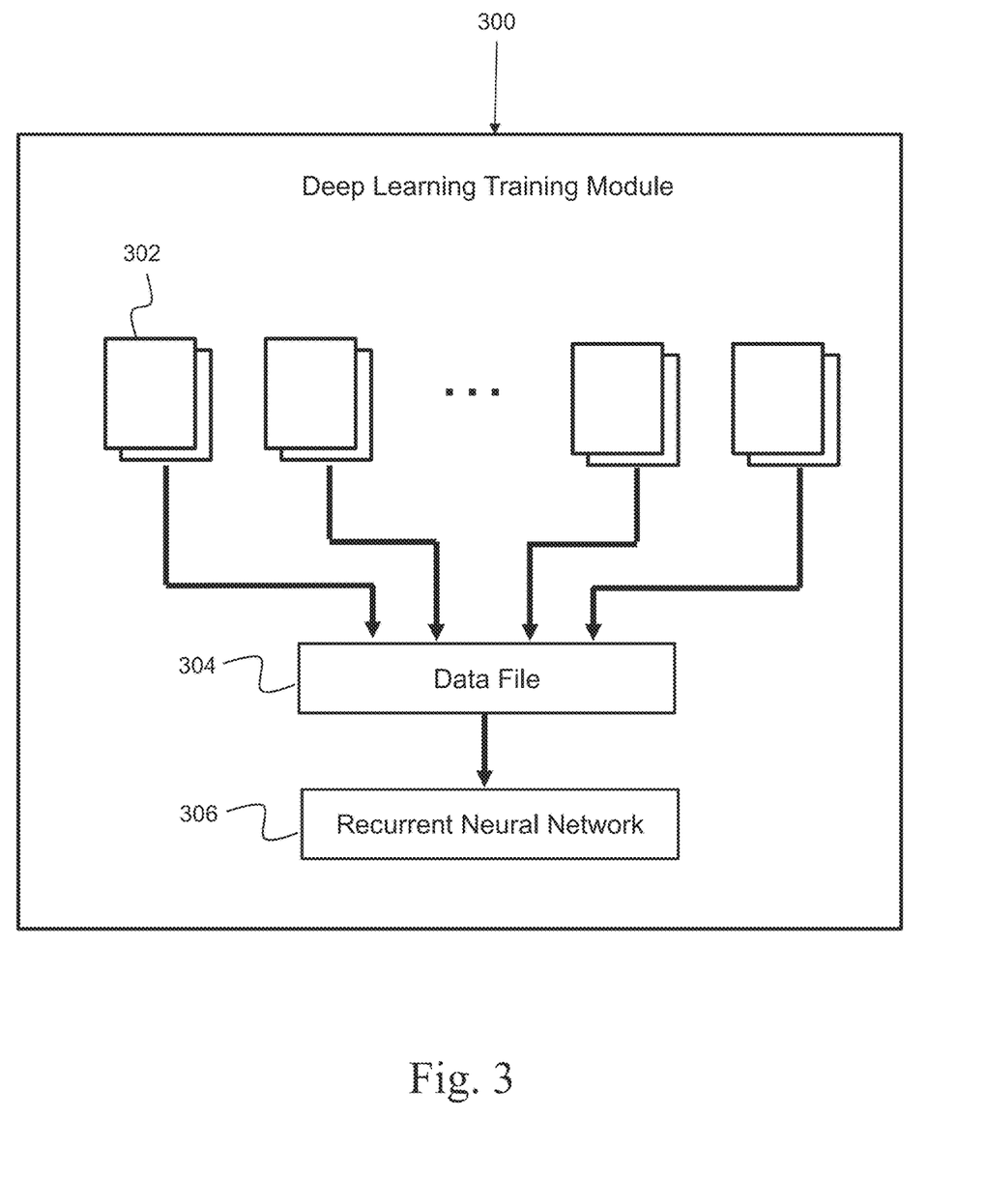
FIG. 3 illustrates a deep learning training module under an embodiment of the present invention.

FIG. 3 illustrates a deep learning training model 300 included in the automated UI testing module of the present invention. The deep learning training model 300 comprises a plurality of elements 302 received by the deep learning training model 300 from a variety of resources. The plurality of elements 302 are compiled and stored in a data file 304 and used to train the deep learning training model 300 via recurrent neural network 306.

Deep learning training model 300 may be based on a variety of languages or foundational machine learning categories. For example, deep learning training model 300 may be based on natural language programming. In some embodiments, deep learning training model 300 is based on HTML schema and/or other schema housed via open source websites. In some embodiments, deep learning training model 300 is based on a bi-directional long short-term memory (LSTM) recurrent neural network architecture, allowing deep learning training model 300 to process entire sequences of data as well as singular data points. In some embodiments, deep learning training model 300 may be trained initially using transformers configured to support sequence-to-sequence (Seq2Seq) learning to fine-tune the training model. In some embodiments, Bidirectional Encoder Representations from Transformers (BERT) and/or Generative Pre-trained Transformer (GPT) implementations are included to ensure deep learning training model 300 is developed in a more comprehensive and robust manner than otherwise possible using only a single deep learning algorithm or implementation.

In embodiments wherein deep learning training model 300 is based on LSTM, the neural network may be trained using differential learning rates, thereby causing different parts of the network to be trained at different learning rates. This ensures that constituent parts of the neural network are trained at individually optimal rates to obtain ideal results. In some embodiments, learning rate for the deep learning training model 300 is determined using a layered Application Programming Interface (API), that incorporates a library of deep learning components such as fastai (including, for example, a learning rate finder algorithm which plots learning rate versus loss relationship).

It will be readily appreciated that deep learning training model 300 is not trained in a single instance based on predetermined parameters or pre-stored data. Instead, deep learning training model 300 is configured to continually update via new elements 302 received and stored in data file 304 and processed via recurrent neural network 306. In this manner, deep learning training model 300 is responsive to new associations between elements and successful flow path testing. Furthermore, recurrent neural network 306 may be trained over the course of sufficient element 302 inputs to predict similarities between elements and their associated successful UI testing attributes. Thus, deep learning training model 300 integrates self-healing machine learning into an automated UI testing system to detect, diagnose, resolve errors in a resource UI automatically using pre-configured error handling libraries, and may add a further layer of automated capability to underlying automated testing systems.

By way of non-limiting example, in some embodiments deep learning training model 300 is configured to receive Xpaths (elements 302) from a variety of websites to build a reliable data file 304 sufficient to train recurrent neural network 306. The Xpaths are associated with attributes, including flow attributes and script updates required for successful flow path resolution. In some embodiments, the deep learning training model 300 is configured to receive a pair of concatenated Xpaths as an input. Prior to being passed to deep learning training model 300 as an input, the concatenated pair of Xpaths is tokenized based on a pre-configured training vocabulary. The deep learning training model 300 determines a probability score ranging from zero (0) to one (1) that is based on the similarity of the Xpaths in the concatenated pair. In some embodiments deep learning training model 300 is trained to expect a probability score of one (1) to indicate a high similarity between Xpaths in the concatenated pair and a score of zero (0) otherwise. In this manner, deep learning training model 300 can be trained to recognize and identify similar Xpaths and/or locators When a user inputs a URL identifying a particular website as the resource for testing by the automated UI testing module, the testing module carries out execution sequence 200, including identifying UI and flow changes and sending them to the deep learning training model 300. The training model then retrieves attributes associated with the identified UI and flow changes based on stored Xpaths in the data file 304 to update elements and conduct automated UI testing. Over the course of additional iterations of this process, data file 304 will comprise an increasing number of Xpaths and associated attributes which may be drawn from to provide self-healing testing, in which deep learning training model 300 predicts desirable attributes and element updates associated with previously unencountered UI or flow changes. In instances where unresolved errors are still encountered, error statistics and details may be displayed in result dashboard 212.

Figure 4A:
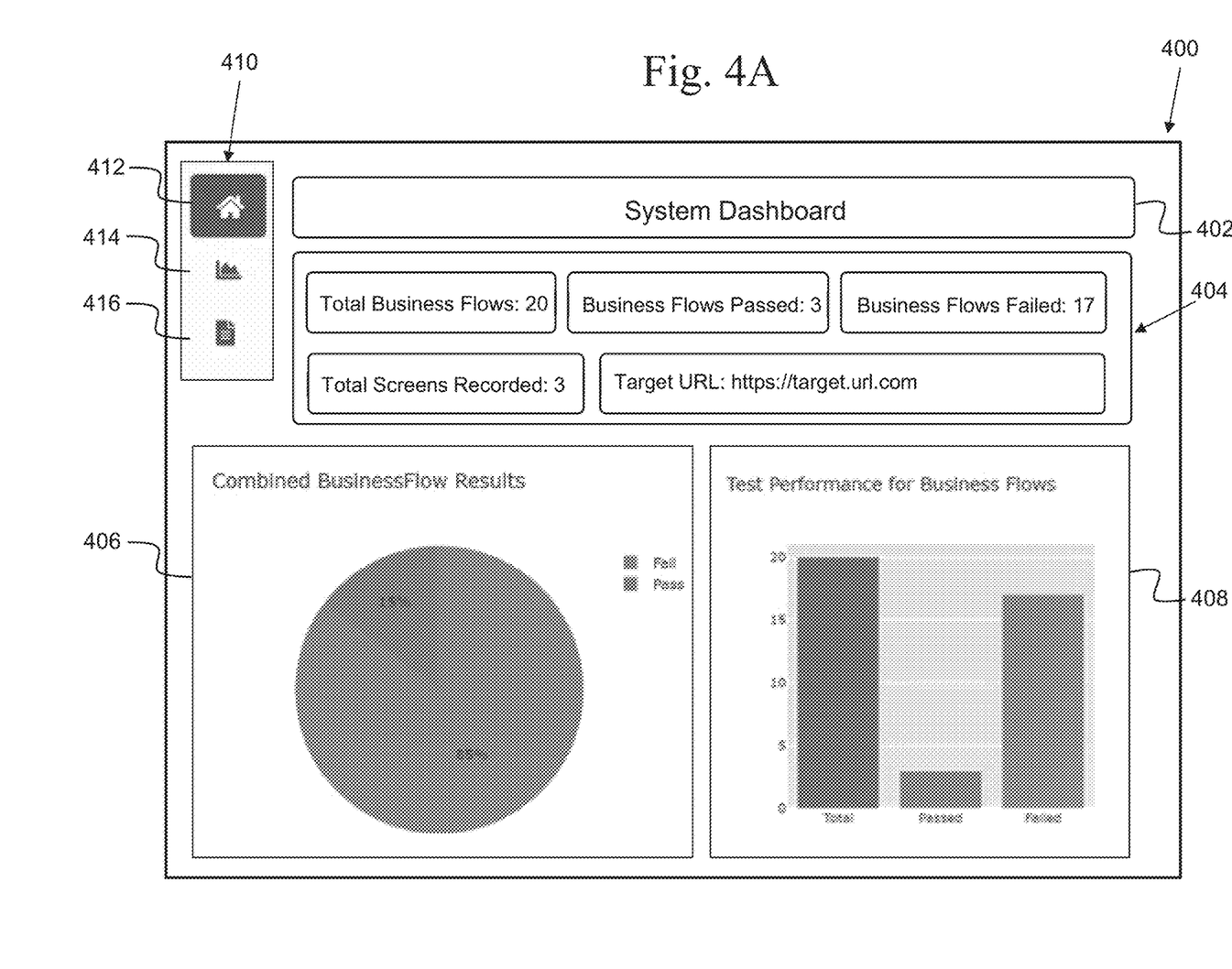
FIGS. 4A-4D illustrate an interactive result dashboard under an embodiment of the present invention.

FIGS. 4A to 4D illustrate an interactive result dashboard under an embodiment of the present invention. As shown in FIG. 4A, dashboard 400 includes one or more dashboard headers 402, textual result elements 404, and graphical result elements 406, 408. Dashboard 400 also includes navigation panel 410, which includes two or more navigation buttons such as home button 412, analysis button 414, and results button 416.

In some embodiments, dashboard 400 is displayed via a web application, thus enabling a user to view and interact with dashboard via a web browser on a device connected to the internet. In these embodiments, dashboard 400 is configured to dynamically resize and receive different types of inputs based on the device used by the user, further improving wide compatibility and ease of use and access. For example, the web application may modify the size and placement of dashboard elements differently for a user accessing the dashboard on a vertically-held smartphone than for a user accessing the dashboard on a larger tablet being held in a landscape orientation. In some embodiments, dashboard 400 is instead displayed via an independent software package configured for a specific client and/or implementation, thereby decreasing compatibility in favor of security and/or customized analysis.

Dashboard headers 402 are primarily displayed to organize and information displayed to the user via dashboard 400. The dashboard may include one or many textual result elements 404 depending on the type of analysis conducted by the system or requested by the user. As depicted in FIG. 4A, textual result elements 404 may be grouped together and summarize result data to give the user a high-level summary of the results of a conducted analysis. In some embodiments, textual result elements 404 may be displayed under separate dashboard headers 402 and in connections with different graphical result elements 406, 408 for optimal organization and ease of reference by a user. Textual result elements 404 may include static text for conveying text consistently to a user between tests, and dynamic text for results and data specific to a particular test conducted. Dashboard 400 also includes one or more graphical result elements 406, 408 such as pie chart 406 and bar graph 408. As depicted in FIG. 4A, the graphical result elements 406, 408 may convey to the user a graphical summary of results of a test conducted, such as the number and proportion of business flows which passed or failed testing.

Figure 4B:
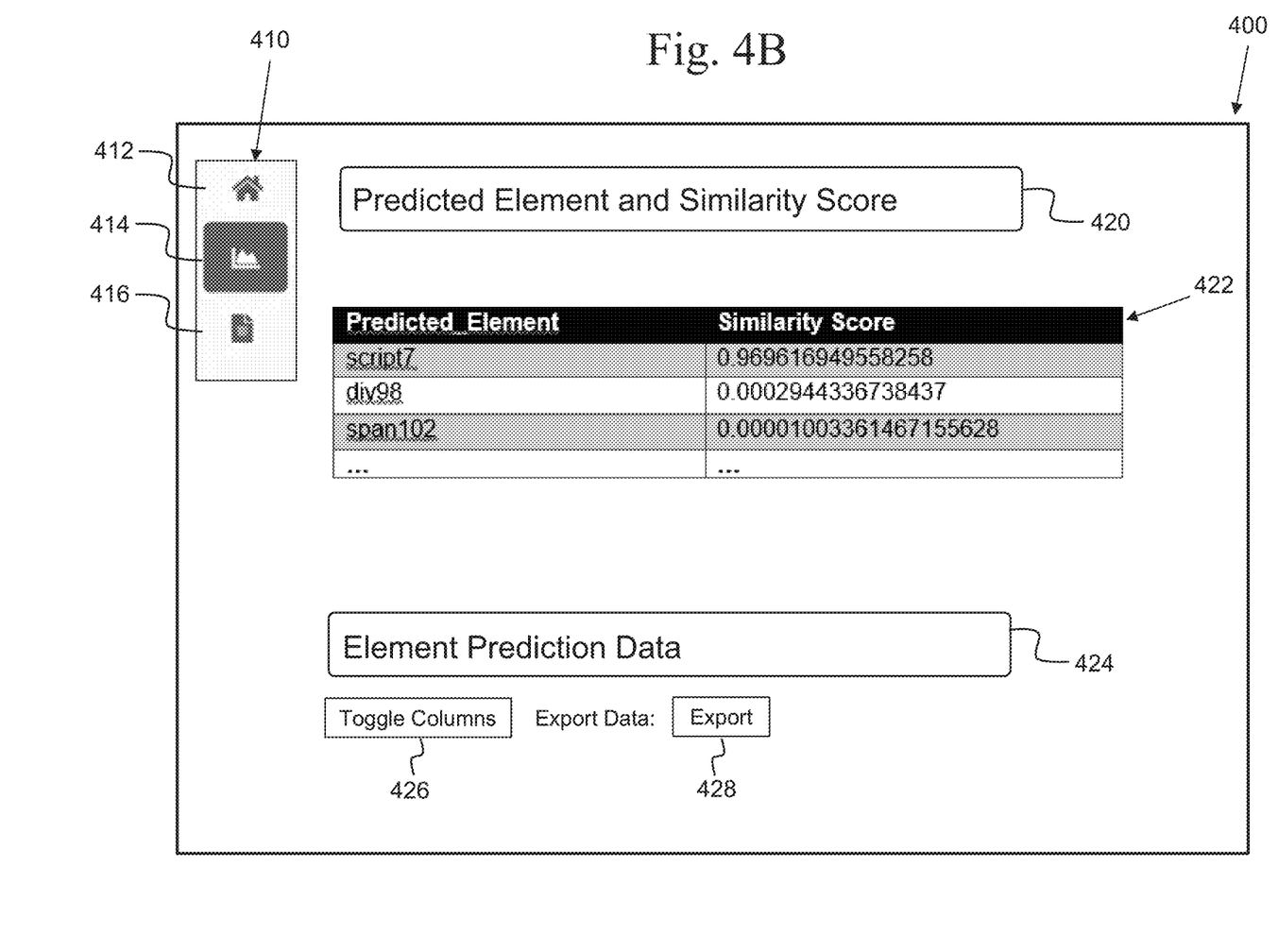

As shown in FIG. 4B, dashboard 400 may also include one or more data tables 422 and data interaction buttons 426, 428. For example, in a portion of dashboard 400 displayed when a user selects analysis button 414, a data table 422 may be displayed under score heading 420 or similar heading.

Various data interaction buttons 426, 428 may be displayed to a user under a data interaction heading 424, which, for example, enable a user to toggle columns (toggle columns button 426) displayed in data table 422 and export (export button 428) data from data table 422 into a format viewable via an external software package, such as comma-separated values (CSV), .xlsx, .xlsm, or .xml formats.

Figure 4C:
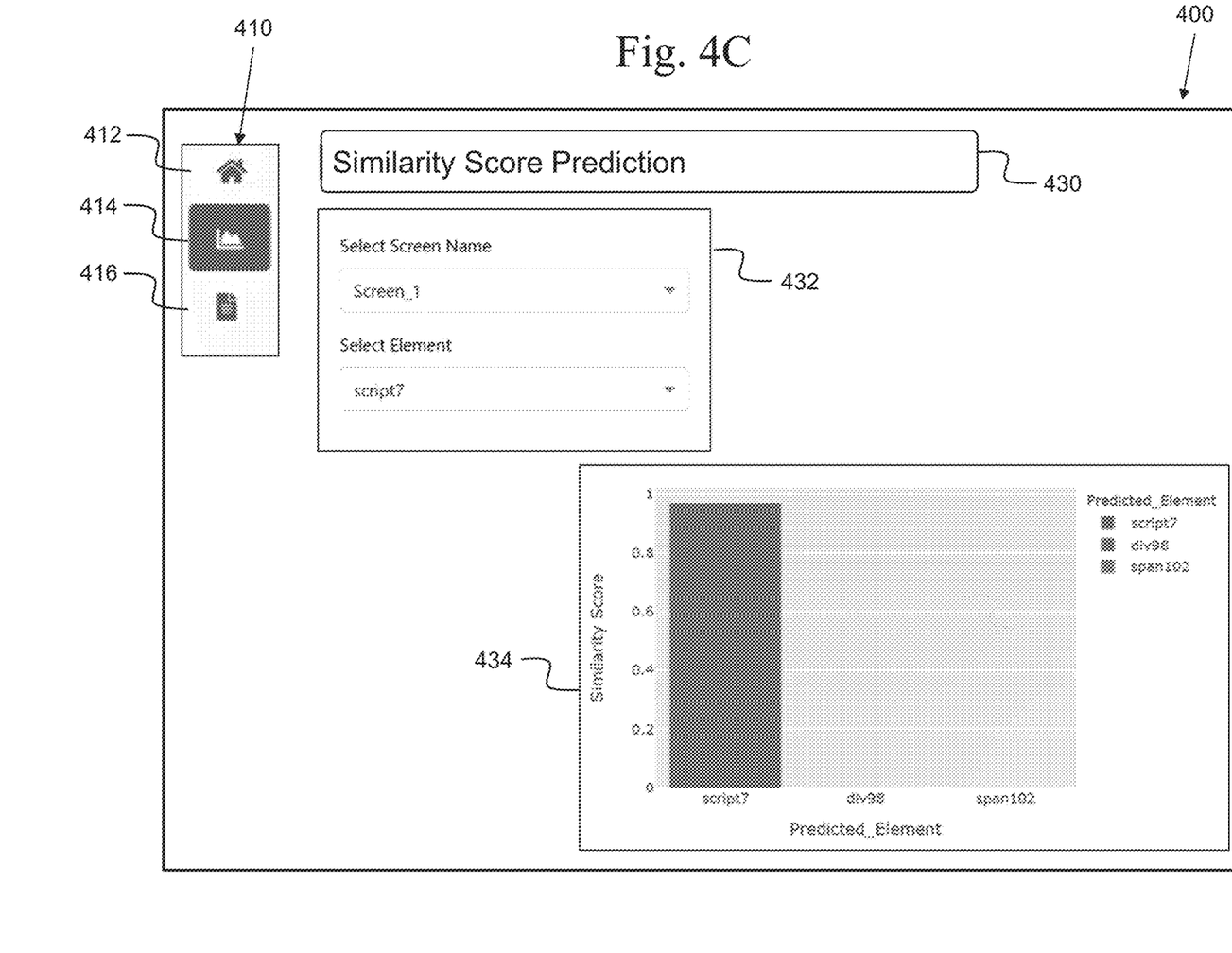

As shown in FIG. 4C, dashboard 400 may also include score prediction header 430, one or more interactive elements 432, and dynamic result element 434. In the depicted embodiment, interactive element 432 enables a user to select different screens or web pages associated with the tested URL based on name. Interactive element 432 further enables a user to select elements of the chosen screen. Although the depicted embodiment includes dropdown menus for selecting relevant fields within the depicted categories, it will be readily appreciated that other embodiments of interactive element 432 are possible, and may include different categories and fields. Likewise, some embodiments may include different types of interactive elements than dropdown menus, such as radio buttons, checkboxes, sliders, and the like. In the depicted embodiment, dashboard 400 also displays to the user a dynamic result element 434 depicting similarity scores for each element analyzed depending on the user's selection in interactive element 432.

Figure 4D:
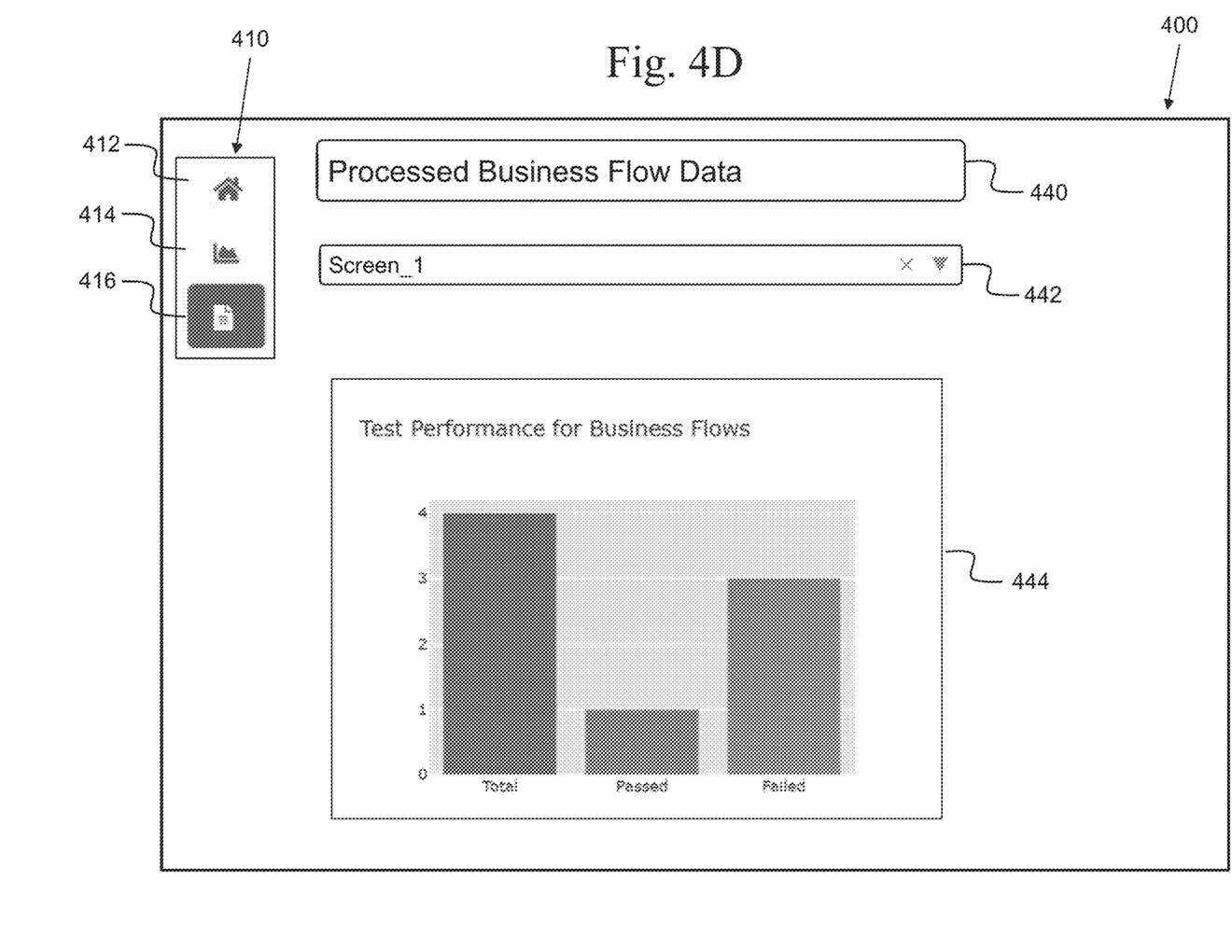

FIG. 4D depicts a dashboard 400 in which a user has selected results button 416. In the depicted embodiment, dashboard 400 includes flow data result header 440, interactive element 442, and dynamic result element 444. Although interactive element 442 is depicted as a dropdown menu, it will be readily appreciated that other typed of interactive elements for engaging a user and enabling the user to select different data within the field may also be implemented. Dynamic result element 444 may display different result data depending on the user's selection in interactive element 442, and may display, for example, business flow test data showing the total number of business flows tested, the number of flows which passed, and the number of flows which failed.

The present invention offers many advantages over conventional testing systems, particularly in the field of automated UI testing. First, because the user enters only a URL and the result dashboard comprises commonly understood visual and textual information, the automated UI testing system disclosed dramatically reduces the complexity of UI testing. UI testing implementers may currently be required to hire or train personnel with specialized programming know-how to deal with back-end script changes that must accompany UI changes. Furthermore, once a UI change and accompanying back-end modification is made, a person or entity must maintain the back-end script through additional versions or iterations. In many instances, this results in large maintenance logs that must be updated frequently and manually based on manually altered scripts. This makes UI modification and testing cumbersome and inefficient in terms of time, money, and processing power expended.

In contrast, implementers of the presently described automated UI testing system may make UI testing accessible to a significantly wider subset of its personnel, thereby reducing, if not eliminating, reliance on highly specialized personnel. In addition to time and cost savings associated with personnel requirements, the automated UI testing system also increases the speed with which UI testing detects and resolves errors, effectively preempting errors and resolving them via the self-healing deep learning training model previously described. Thus, UI testing is achieved in less time, requiring less computational power, and consuming less energy. Furthermore, the automated UI testing system described may handle more than one error at a time, which can quickly grow in complexity to the point that it is beyond the practical capability of human UI testing in conventional systems. Indeed, current UI testing is often accomplished by testing an entire resource targeting a single error at a time to ensure proper resolution of the error.

It will be readily appreciated that while the embodiments described refer to websites and website elements, the described invention can be used in association with a variety of other computerized document types and formats. In addition, the automated UI testing system described may be integrated with one or more automated testing systems and even automated testing systems configured for wider compatibility between operating systems, applications, application-specific libraries, and programming languages. Indeed, the present invention may receive and store a plurality of resource elements of varying programming languages in order to build a more comprehensive neural network and achieve a higher success rate in self-healing during automated UI testing.

Certain features which, for clarity, are described in this specification in the context of separate embodiments may also be provided in combination in a single embodiment. Conversely, various features which, for brevity, are described in the context of a single embodiment may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

It is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or"

mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

The foregoing description is presented for purposes of illustration. It is not exhaustive and is not limited to the precise forms or embodiments disclosed. Modifications and adaptations of the embodiments will be apparent from consideration of the specification and practice of the disclosed embodiments.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for implementing automated testing services comprising:
    at least one processor; and
    at least one memory storing instructions that, when executed by the at least one processor, cause the system to perform operations comprising:
        receiving from a user a resource identifier associated with a resource;
        detecting one or more changes in a user interface of the resource;
        detecting whether the resource includes one or more flow path errors;
        retrieving, from a database, one or more update attributes associated with each of the one or more changes in the user interface; and
        updating the resource to incorporate each of the one or more update attributes.

2. The system for implementing automated testing services of claim 1, wherein the instructions are further configured to cause the system to retrieve, from the database, one or more update attributes associated with one or more similar changes in the user interface when one or more update attributes associated with any of the one or more changes in the user interface are not stored in the database.

3. The system for implementing automated testing services of claim 1, wherein the instructions are further configured to cause the system to display on a user device a result dashboard, the result dashboard comprising one or more graphical notifications of the one or more detected flow path errors.

4. The system for implementing automated testing services of claim 3, wherein the result dashboard further comprises one or more interactive features which the user may manipulate and one or more graphical result elements that are based on a user's selection in the one or more interactive features.

5. The system for implementing automated testing services of claim 2, wherein the instructions are further configured to cause the system to: store the update attributes associated with the one or more similar changes in association with the one or more changes in the user interface when no flow path error is detected.

6. The system for implementing automated testing services of claim 1, wherein the resource identifier is a Uniform Resource Locator (URL).

7. The system for implementing automated testing services of claim 1, wherein the instructions are further configured to cause the system to: retrieve, from the resource, Xpaths or locators associated with the resource.

8. The system for implementing automated testing services of claim 7, wherein the instructions are further configured to cause the system to: determine a probability score based on a comparison of two or more of the Xpaths or locators and train a deep learning model based on the probability score.

9. A method for implementing automated testing services comprising:
    receiving from a user a resource identifier associated with a resource;
    detecting one or more changes in a user interface of the resource;
    detecting whether the resource includes one or more flow path errors;
    retrieving, from a database, one or more update attributes associated with each of the one or more changes in the user interface; and
    updating the resource to incorporate each of the one or more update attributes.

10. The method for implementing automated testing services of claim 9, further comprising retrieving, from the database, one or more update attributes associated with one or more similar changes in the user interface when one or more update attributes associated with any of the one or more changes in the user interface are not stored in the database.

11. The method for implementing automated testing services of claim 10, further comprising displaying on a user device a result dashboard, the result dashboard comprising one or more graphical notifications of the one or more detected flow path errors.

12. The method for implementing automated testing services of claim 11, wherein the result dashboard further comprises one or more interactive features which the user may manipulate and one or more graphical result elements that are based on a user's selection in the one or more interactive features.

13. The method for implementing automated testing services of claim 11, further comprising storing the update attributes associated with the one or more similar changes in association with the one or more changes in the user interface when no flow path error is detected.

14. The method for implementing automated testing services of claim 9, wherein the resource identifier is a Uniform Resource Locator (URL).

15. The method for implementing automated testing services of claim 9, further wherein the one or more update attributes comprise one resource identifier is a Uniform Resource Locator (URL).

16. The method for implementing automated testing services of claim 9, further comprising retrieving, from the resource, Xpaths or locators associated with the resource.

17. The method for implementing automated testing services of claim 16, further comprising determining a probability score based on a comparison of two or more of the Xpaths or locators and train a deep learning model based on the probability score.

18. A method for implementing automated testing services, comprising:
- receiving from a user a resource identifier associated with a resource;
- detecting one or more changes in a user interface of the resource;
- detecting whether the resource includes one or more flow path errors;
- retrieving, from a database, one or more update attributes associated with each of the one or more changes in the user interface;
- updating the resource to incorporate each of the one or more update attributes; and
- updating the database based on input from a recurrent neural network.

* * * * *

UNITED STATES PATENT AND TRADEMARK OFFICE
CERTIFICATE OF CORRECTION

| | |
|---|---|
| PATENT NO. | : 11,741,074 B2 |
| APPLICATION NO. | : 17/492236 |
| DATED | : August 29, 2023 |
| INVENTOR(S) | : Harsh Sharma et al. |

It is certified that error appears in the above-identified patent and that said Letters Patent is hereby corrected as shown below:

In the Claims

In Claim 11, Column 10, Line 49, "of claim 10," should read --of claim 9,--.

In Claim 13, Column 10, Line 61, "of claim 11," should read --of claim 10,--.

Signed and Sealed this
Sixth Day of February, 2024

Katherine Kelly Vidal
*Director of the United States Patent and Trademark Office*